April 23, 1963

J. J. KEYSER 3,086,349

SPINDLE BELT DRIVE

Filed April 13, 1961

INVENTOR

JOHANN JACOB KEYSER

BY

April 23, 1963  J. J. KEYSER  3,086,349
SPINDLE BELT DRIVE
Filed April 13, 1961
4 Sheets-Sheet 3
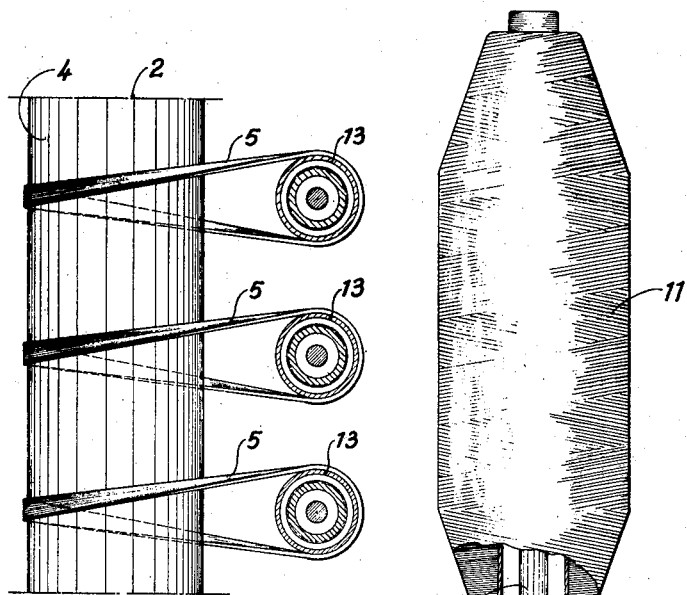
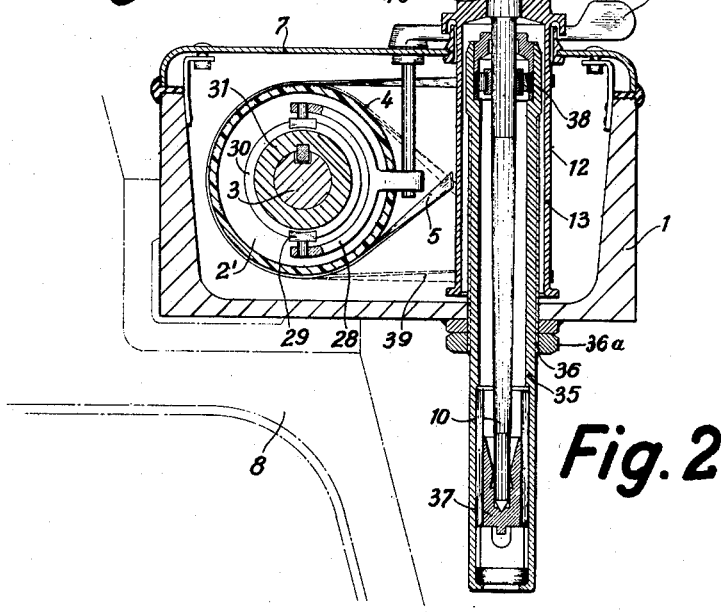
Fig. 4
Fig. 2

United States Patent Office 3,086,349
Patented Apr. 23, 1963

3,086,349
SPINDLE BELT DRIVE
Johann Jacob Keyser, Grabenallee 16, Aarau, Switzerland
Filed Apr. 13, 1961, Ser. No. 102,794
Claims priority, application Germany Apr. 16, 1960
3 Claims. (Cl. 57—104)

It is known to drive the spindle of spinning machines by an endless belt which extends around the whorl of the spindle and around a driving drum. Inasmuch as with heretofore known drives the diameter of the drum is relatively great in comparison to the diameter of the whorl, deviating and tensioning pulleys are provided which will assure central guiding of the belt on the whorl. This arrangement is found in connection with textile machines in which the driving drum is spaced by a greater distance from the whorl and also in connection with machines in which the drum is arranged in the immediate vicinity of the whorl and, with a correspondingly shorter diameter of the drum, even below the plane of the spindle rail. At any rate, deviating and tensioning rollers are provided and necessary by means of which the driving belt is continuously given a certain tension so that when the drum is started, the belt will immediately be driven in a jerk-like manner. While this jerk will be somewhat cushioned by the yieldability of the belt and a yieldable journalling of the tensioning pulley, the belt is nevertheless subjected to a considerable stress and the spindle starts with a jerk.

A further drawback of this heretofore known arrangement consists in that when breaking the whorl, the belt driven by the drum will drag on the whorl and thus will be subjected to a wear which is particularly high when the belt consists of synthetic material or a fabric containing synthetic material.

It is, therefore, an object of the present invention to provide a belt drive for a spindle, which will overcome the above mentioned drawbacks.

It is another object of this invention to provide a spindle belt drive which will make it possible to effect the drive in both directions of rotation without requiring any particular auxiliary means.

These and other objects and advantages of the invention will appear more clearly from the following specification in connection with the accompanying drawings, in which:

FIG. 2 illustrates in section a modified spindle with belt drive and with a driving drum adapted selectively to be disengaged from the driving shaft.

FIG. 4 is a top view of a modified drum arrangement for driving spindles.

Figure 3:
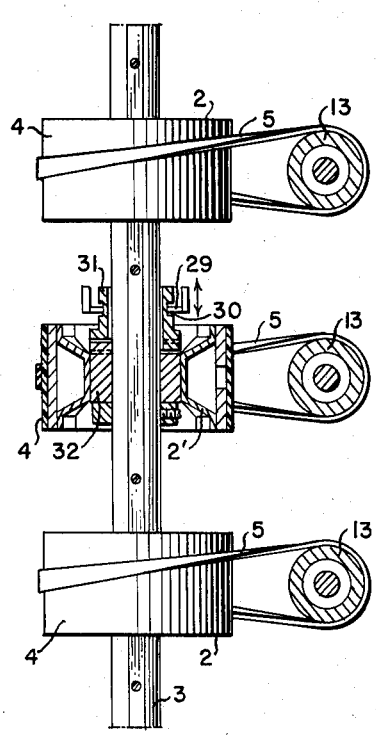
FIG. 3 is a top view, partly in section, of a drum arrangement for the spindle drive according to the invention.

The present invention starts with a spindle belt drive by means of a driving drum the axis of which forms an angle of preferably 90° with the spindle axis. The belt is in an endless manner passed around the driving drum and also around the running surface of the driving element of the spindle. According to the present invention, the axial length of the running surface of the cylindrical driving element of the spindle around which the belt is passed amounts to a multiple of the width of the belt and at least to the radius of the drum. One end of the running surface is located at least in that plane which is vertical to the spindle axis and tangentially contacts the periphery of the drum. If with a spindle drive according to the present invention the drum is not driven, the belt will loosely pass around the drum and also loosely about the whorl so that no positive connection exists between the drum and the whorl. The drum may be stopped for instance in that the drum is preceded by a clutch. If this clutch is engaged and if the drum rotates, the belt will be tightened. As a result thereof, the looping around the whorl will automatically be displaced in the direction to that end of the running surface of the whorl which is located approximately in the plane which is perpendicular to the spindle axis and tangentially contacts the periphery of the drum.

When the drum is stopped, the belt is slackened and the looping portion is displaced in the direction toward the other end of the running surface. Inasmuch as during the start of the drum, i.e. when the belt is tightened, the displacement of the looping portion of the belt on the whorl is effected in a continuous manner toward the other end, a continuous increase in the speed of the spindle will result so that the spindle will start in a gradual manner. Similarly, also a gradual stopping of the spindle will be assured when the drum is stopped.

A further advantage of the present invention consists in that differences in the length of the belt are automatically compensated for and do not exert an influence upon the driving operation proper. This is due to the fact that each belt displaces itself automatically to one or the other end of the running surface until all belts have the same tension. The displacement stroke may thus with the belts be different and depends on the length of the belt, the extension or tension. Moreover, the belt will excel by a long life because it is not subjected to jerk-like stresses but will always be gradually started or stopped.

A further advantage of the invention consists in that the drive of the spindle may be effected in both directions of rotation without changing the drive. To this end, in conformity with the present invention, the running surface of the cylindrical driving portion of the spindle is symmetrically arranged on both sides of a horizontal plane through the axis of the drum, and the length of the running surface totals at least the diameter of the drum. If the drum is at a standstill, the belt passes around approximately the central portion of the running surface on the whorl. The tension at which the belt embraces the whorl is so low that in this condition the whorl will not be rotated. If now the drum starts rotating, automatically one portion of the belt will be tensioned and the belt will in conformity with the direction of rotation move toward one or the other end of the running surface of the whorl. During this movement, the force will increase gradually at which the belt begins to rotate the whorl. The belt moves automatically out of its central position in one or the other direction in conformity with the length of the belt and its elasticity so that when a plurality of spindles are arranged adjacent each other, the same speed of rotation will be assured for all spindles in spite of the different length of the belts. When the drum is stopped, the belt will automatically return to its central position, and the power connection between drum and whorl will be interrupted.

A corresponding slackening or tensioning will be obtained when the spindle disengages the cylindrical driving portion. While, following the disengaging operation, the cylindrical driving portion will be further driven by the belt, it will be appreciated that inasmuch as its mass is rather small, the belt will slacken and will automatically move to its central position. If the connection between spindle and driving element is again established, the belt will gradually tighten by its movement toward the end of the cylindrical driving portion so that the spindle will again be rotated. In this way, the same advantages are obtained as they are realized with the starting and stopping of the drum.

In addition to the above mentioned advantages, the spindle belt drive according to the present invention has the further advantage that the force increasing during the starting operation which is exerted upon the whorl by the belt will prevent the spindle from dancing.

According to a further embodiment of the invention, spindles are journalled in a manner known per se on both sides of the axis of the drum, said spindles being offset with regard to each other in the direction of the axis of the drum by at least the length of one diameter of the cylindrical driving part of the spindle. This arrangement furnishes the possibility of driving the spindles from both sides by a drum common thereto. The spindles on both sides may be moved relatively close to each other. It is possible so to design the arrangement that the belts of two oppositely located spindles pass around the drum closely adjacent each other without, however, interfering with each other.

Referring now to the drawings in detail, the same parts have been designated with the same reference numerals throughout the various figures. More specifically, the arrangement comprises a spindle rail 1, a driving drum 2 without clutch and a driving drum 2' with clutch. The axle of the drum is designated with the reference numeral 3 while the periphery of the drum is designated with the reference numeral 4. A driving belt 5 passes around the periphery 4 of the drum. The spindle sleeve carrying the yarn body 11 is designated with the reference numeral 6 while the spindle rail is covered by a cover 7. The arrangement according to the present invention furthermore comprises a machine frame 8, a clutch control lever 9, and a spindle shank 10.

As will be evident from the drawings, the driving drums 2, 2', the drum axle 3, the drum periphery 4 and the driving belt 5 are arranged within the hollow spindle rail 1 which latter is closed toward the upper end by a cover 7. Belt 5 which partially embraces drums 2, 2' also passes around the running surface 12 of the cylindrical driving member 13 of the spindle. Belt 5 which may have any desired cross section preferably consists of a material which is elastic to a certain extent, for instance of nylon or similar synthetic materials which may also have incorporated therein textile fabrics, metal inserts, or the like. The axial length of the running surface 12 of the cylindrical driving member 13 of the spindle is according to the showing in the drawing somewhat longer than the diameter of the drums 2, 2'.

Figure 1:
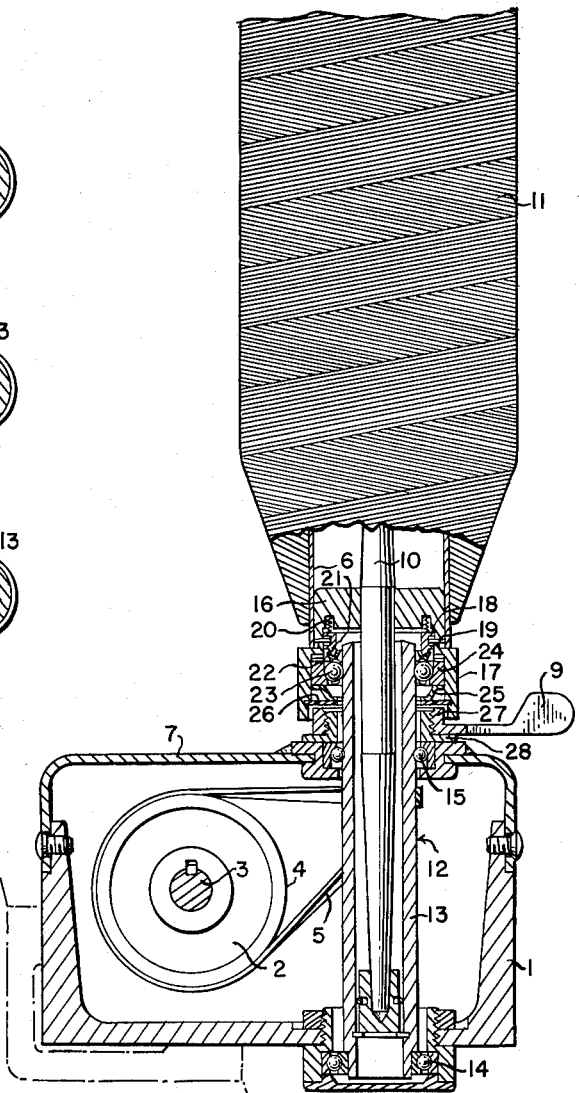
FIG. 1 illustrates a section through a spindle with a belt drive according to the invention which is arranged in the spindle rail and is provided with coupling means for drivingly engaging the cylindrical spindle drive element and the spindle.
Figure 1A:
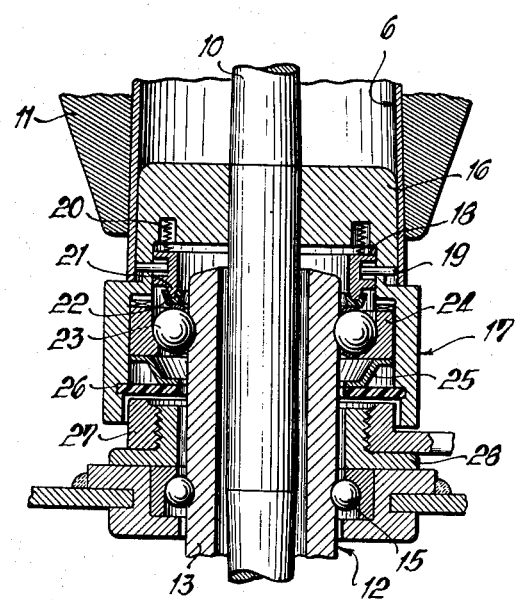
FIG. 1a shows the central portion of FIG. 1 but on a considerably larger scale than that of FIG. 1.

Referring now specifically to FIGS. 1 and 1a, the cylindrical drive member 13 of the spindle is journalled in the spindle rail 1 by means of anti-friction bearings 14 and 15. The upper free end of the cylindrical drive member 13 has mounted thereon the sleeve carrier 16 by means of a clutch generally designated 17. This clutch is adapted to be actuated by a clutch lever 9. The sleeve carrier 16 carries the sleeve 6.

The anti-friction bearing clutch 17 illustrated merely by way of example comprises a grooved ring 18 the axial displacement stroke of which is limited by a spring ring 19, the displacement of ring 18 in upward direction being effected against the thrust of springs 20. The axially directed collar of grooved ring 18 is engaged by the anti-friction bearing cage 22 the balls 23 of which roll directly on the cylindrical driving member 13 and on the outer race ring 24 which latter is inserted into the sleeve carrier 16 so as to be able slightly to move in axial direction. Arranged below the race ring 24 is a profiled annular spring 25 engaged from below by an elastic friction ring 26. The clutch lever 9 forms a part of a nut 27 screwed onto the threaded bushing 28. When the clutch lever 9 is turned in clockwise direction, the nut body 27 will be displaced upwardly and in axial direction on the threaded bushing 28 which is firmly connected to the bearing body of the antifriction bearing 15. When the nut body 27 moves upwardly, it displaces the sleeve carrier 16 upwardly through the intervention of the elastic friction ring 26 which is connected to the lower portions of sleeve carrier 16. As a result thereof, the grooved ring 18 disengages the cage 22 of the anti-friction bearing 23. Consequently, the anti-friction bearing 23 idles and does not any longer turn the lower sleeve carrier 16 which latter due to the frictional engagement between friction disc 26 and nut body 27 will be braked. Thus, sleeve 6 or cop 11 will be brought to a standstill although the cylindrical driving member 13 of the spindle continues to rotate. Inasmuch as with the driving member 13 idling, the belt 5 has to convey a relatively low driving force only, the portion of the belt passing around the cylindrical driving member 13 will move downwardly approximately to the level of the horizontal plane passing through the axle 3 of the drum. If it is intended again to drive the spindle, the clutch lever 9 is turned in clockwise direction whereby the grooved ring 18 will engage cage 22 so that the sleeve carrier 16 will again be rotated by the spindle drive member 13 through the intervention of the anti-friction bearing 23. This drive will be effected without shocks or jerks because belt 5 will only gradually tighten and will do so at the ratio at which it moves upwardly along the running surface 12 of the driving member 13.

With reference to FIG. 2, the drum employed therein may for instance be of the type shown in FIG. 4. This drum is a continuous driving drum 2 simultaneously driving a plurality of spindles and consequently having passed therearound a plurality of belts 5. Instead of a continuous or one piece drum it is, of course, also possible to provide a plurality of individual drums for each belt 5 respectively as shown in FIG. 3, which drums may be of the type represented as the upper and lower drum 2 in FIG. 3.

Instead of providing the clutch with clutch lever 9 on the spindle, there also exists the possibility to arrange the clutch on the axle 3 of the drum which clutch would then permit selectively to disengage drum 2' from the axle 3.

Drums equipped with a clutch are illustrated for instance in FIGS. 2 and 3. In FIG. 3, merely the intermediate drum 2' is equipped with a clutch whereas the upper and lower drums 2 in FIG. 3 are without clutch. The clutches are of a well known design, the levers 9 of which are adapted axially to displace the clutch forks 28 with the groove engaging members 29. These members 29 engage an annular groove 30 of the hub body 31 which when being displaced disengages the drum hub 32 so that the latter rotates in an idling manner in view of its disengagement from the axle 3. If desired, the disengagement of the drum hub 32 from axle 3 may be coordinated with a braking operation.

According to the embodiment of FIG. 2, the cylindrical drive member 13 is tubular similar to that of FIG. 1 while the head piece 13' serves for supporting sleeve 6. The journalling is effected by means of tubular body 33 which is inserted into head piece 13' through the intervention of an elastic hollow ring 34 adapted to permit certain pendulum movements of sleeve 6. In the interior of the cylindrical drive member 13 there is arranged the tubular body 35 which is connected to the spindle rail 1 at 36 by means of a thread and a nut 36a. At the lower end of the tubular body 35 the lower end of the spindle shank 10 rests on an elastic sleeve 37 the axial location of which is variable in conformity with the length of the spindle shank 10. The spindle shank 10 is furthermore journalled in the upper end of the tubular body 35 by means of the anti-friction bearing 38. With this arrangement, the cylindrical drive member 13 is supported by the spindle shank 10 inserted into bore 40 which shank 10 rests on one hand in the anti-friction bearing 38 and on the other hand in the supporting sleeve 37. Similar to the embodiment according to FIG. 1, spindle shank 10 and cylindrical drive member 13 rotate together. In all other respects, the journalling and arrangement of the spindle corresponds to the well known roller bearing spindle.

The stopping and braking of the spindle is effected by causing drum 2' to disengage the driving axle 3. The braking of the drum also brings about a braking of the spindle or vice versa. If no force is conveyed by belt 5 from axle 3 to the spindles, the belt will slacken to a certain extent so that the belt similar to the embodiment of FIG. 1 will have its portion which passes around the drive members 13 move downwardly on the running surface 12 approximately into the horizontal plane passing through the axle 3. If the direction of rotation is reversed, belt 5 will again tighten and will move downwardly into the position indicated by dash lines and designated with the reference numeral 39. The same would apply to the embodiment of FIG. 1.

Figures 5, 6:
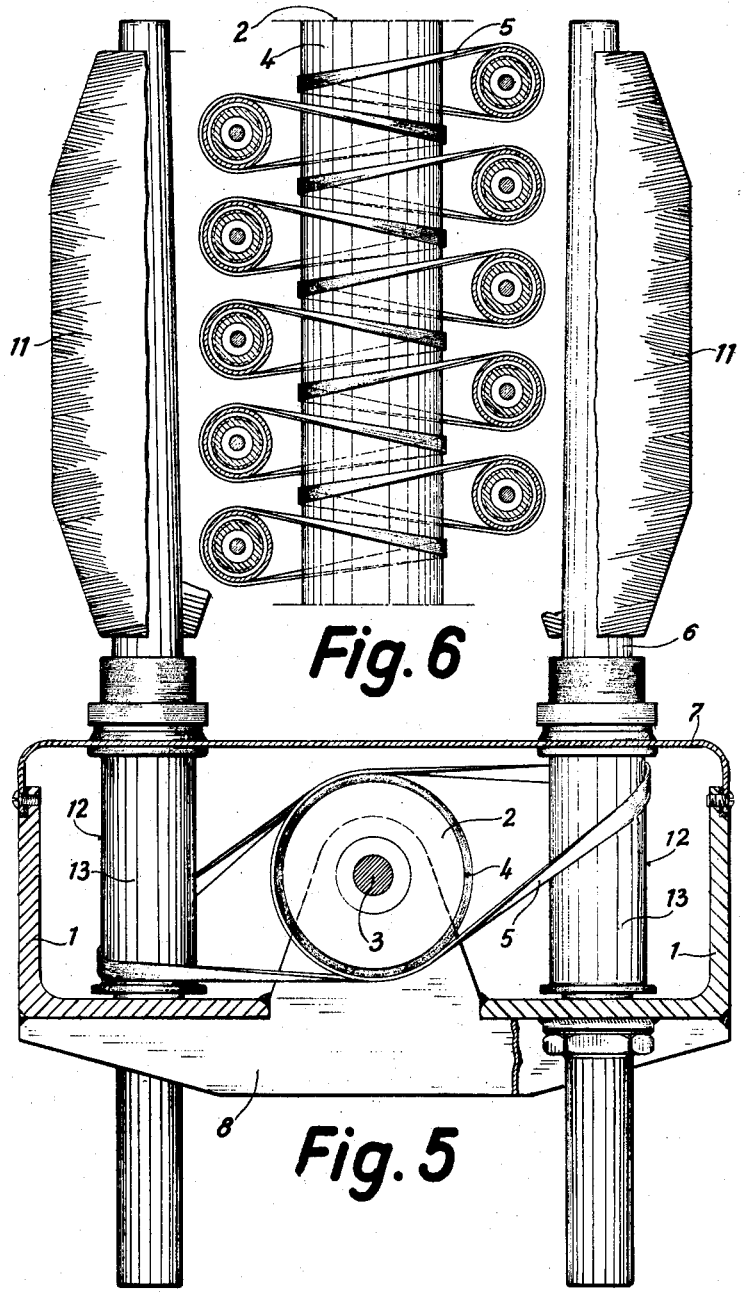
FIG. 5 shows a spindle belt drive in which the spindles of both machine sides are driven by a drum common thereto.
FIG. 6 is a top view of a drive according to FIG. 5 but on a reduced scale.

The embodiment illustrated in FIGS. 5 and 6 shows a spindle drive according to which individual drums or a continuous single drum is employed for driving the spindle of two machine sides on a single drum axle 3. More specifically, one drum is employed of the type shown in FIG. 4 while for the sake of simplicity no clutches have been shown. Belt 5 in FIG. 5 will automatically assume its position during operation in one direction of rotation. When the spindles are stopped, the looping portions of belt 5 move approximately to the center of the running surface 12 of the driving member 13. If the direction of rotation is reversed, the looping portions will move to the respective other end of the running surface 12. This movement is each time associated with a tightening of belt 5 or vice versa. The movement is caused by a tightening of belt 5 while a continuous jerk-free start will be assured and also a gradual jerk-free stopping of the spindles. As will be evident from FIG. 5, the two spindle rails 1 may be firmly connected to each other through the intervention of a machine frame portion 8 and may be covered by a common cover 7' so that also in this instance all driving elements may be housed in a closed housing.

It is, of course, to be understood that the present invention is, by no means, limited to the particular constructions shown in the drawings but also comprises any modifications within the scope of the appended claims.

What I claim is:

1. A spindle belt drive system for textile machines, which comprises: a spindle, a driving member adapted to be drivingly connected to said spindle for rotating the same, said driving member having a belt running surface for engagement with a driving belt, a drum spaced from said driving member and having its axis extending in a direction perpendicular to the longitudinal axis of said driving member, and endless belt passing around said drum and around said running surface of said driving member, said running surface extending in axial direction of said driving member over a minimum length confined by two parallel planes one of which is perpendicular to the axis of said spindle and tangent to the surface of said drum while the other plane passes through the axis of said drum.

2. A spindle belt drive system for textile machines, which comprises: a spindle, a driving member adapted to be drivingly connected to said spindle for rotating the same, said driving member having a belt running surface for engagement with a driving belt, a drum spaced from said driving member and having its axis extending in a direction perpendicular to the longitudinal axis of said driving member, an endless belt passing around said drum and around said running surface of said driving member, said running surface being located opposite to said drum and extending in axial direction of said driving member over a minimum length confined by two parallel planes each of which extends perpendicularly with regard to the axis of said spindle and tangent to the surface of said drum.

3. A spindle belt drive system according to claim 2, in which spindles with cylindrical spindle whorl are provided on opposite sides of the axis of said drum and in which the spindles on one side of said drum axis are offset with regard to the spindles on the opposite side of said drum axis by at least one half the diameter of said cylindrical spindle whorl.

References Cited in the file of this patent

FOREIGN PATENTS

| 1,176,718 | France | Nov. 24, 1958 |
| 1,185,482 | France | Feb. 16, 1959 |